(12) United States Patent
Mordukhovich

(10) Patent No.: US 12,448,042 B2
(45) Date of Patent: Oct. 21, 2025

(54) TANK STEER SYSTEM FOR VEHICLE

(71) Applicant: FCA US LLC, Auburn Hills, MI (US)

(72) Inventor: Gregory Mordukhovich, Bloomfield Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 180 days.

(21) Appl. No.: 18/500,618

(22) Filed: Nov. 2, 2023

(65) Prior Publication Data

US 2025/0145214 A1 May 8, 2025

(51) Int. Cl.
*B62D 11/12* (2006.01)

(52) U.S. Cl.
CPC .................................. *B62D 11/12* (2013.01)

(58) Field of Classification Search
CPC .......... B62D 11/12; B62D 11/06; B62D 11/08
See application file for complete search history.

(56) References Cited

U.S. PATENT DOCUMENTS

| | | | | |
|---|---|---|---|---|
| 4,434,680 A | * | 3/1984 | Riediger | F16H 47/04 475/23 |
| 6,478,706 B1 | * | 11/2002 | Crabb | B62D 11/18 475/28 |
| 6,953,408 B2 | * | 10/2005 | Thompson | B62D 11/14 475/5 |
| 7,294,082 B2 | * | 11/2007 | Lim | B62D 7/142 475/221 |
| 8,844,665 B2 | * | 9/2014 | Wenger | B62D 11/183 180/9.1 |
| 2007/0068710 A1 | * | 3/2007 | Witzenberger | B60L 15/2036 180/6.44 |
| 2024/0246607 A1 | * | 7/2024 | Attibele | B60K 17/165 |
| 2025/0136179 A1 | * | 5/2025 | Vermeulen | B62D 11/06 |

* cited by examiner

*Primary Examiner* — Sizo B Vilakazi
(74) *Attorney, Agent, or Firm* — Jeremy J. Klobucar

(57) ABSTRACT

A tank steer gear set assembly for a vehicle having at least one set of first and second axle shafts. The gear set assembly is configured to be operably coupled between a first portion and a second portion of the second axle shaft, and includes a compound planetary gear set having a carrier, a first clutch, and a second clutch. The gear set assembly operates in a tank steer mode by selectively grounding the carrier via the second clutch such that the second portion of the second axle shaft is rotated in a direction opposite the first axle shaft.

15 Claims, 4 Drawing Sheets

TANK STEER SYSTEM FOR VEHICLE

FIELD

The present application relates generally to vehicles and, more particularly, to systems and methods for performing a tank steer operation in a vehicle.

BACKGROUND

A vehicle is typically limited by the turning circle of the steering system while the vehicle is rolling. In some off-road maneuvers, it is desirable for the vehicle to have a tighter turning radius than what is available on a stock vehicle, for example, if an obstacle prevents the vehicle from moving in a forward direction. In order to provide tighter turning, some electric vehicles can achieve a "tank steer" in order to help the vehicle make sharper turns by driving each wheel with an independent motor. However, such systems are expensive as they require four electric machines, four power inverters, and associated high voltage cables and components. Accordingly, while such systems do work for their intended purpose, there is a desire for improvement in the relevant art.

SUMMARY

In accordance with one example aspect of the invention, a tank steer gear set assembly for a vehicle having at least one set of first and second axle shafts, the gear set assembly configured to be operably coupled between a first portion and a second portion of the second axle shaft is provided. In one example, the tank steer gear set assembly includes a compound planetary gear set having a carrier, a first clutch, and a second clutch. The gear set assembly is selectively operable in a tank steer mode that rotates one or more wheels on a first side of the vehicle in a first direction, and rotates one or more wheels on an opposite second side of the vehicle in a second direction opposite the first direction to thereby rotate the vehicle. The gear set assembly operates in the tank steer mode by selectively grounding the carrier via the second clutch such that the second portion of the second axle shaft is rotated in a direction opposite the first axle shaft.

In addition to the foregoing, the described tank steer gear set assembly may include one or more of the following features: wherein the compound planetary gear set further includes a link connected for common rotation with the carrier; wherein the first clutch selectively couples the link to the first portion of the second axle shaft for common rotation; wherein the gear set assembly is selectively operable in a direct drive mode where the first axle shaft and the second portion of the second axle shaft rotate in the same direction, wherein the gear set assembly operates in the direct drive mode by engaging the first clutch and disengaging the second clutch; and wherein the gear set assembly operates in the tank steer mode by disengaging the first clutch and engaging the second clutch.

In addition to the foregoing, the described tank steer gear set assembly may include one or more of the following features: wherein the compound planetary gear set further includes a sun gear configured to connect to the first portion of the second axle shaft for rotational input, a first pinion gear and a second pinion gear rotatably supported by the carrier on a common axis, and a ring gear configured to provide rotational output to the second portion of the second axle shaft, wherein the sun gear is in meshing engagement with the first pinion gear, the first pinion gear is coupled for common rotation with the second pinion gear, and the second pinion gear is in meshing engagement with the ring gear.

In addition to the foregoing, the described tank steer gear set assembly may include one or more of the following features: wherein the compound planetary gear set further includes a ring gear configured to connect to the first portion of the second axle shaft for rotational input, a first pinion gear and a second pinion gear rotatably supported by the carrier on a common axis, and a sun gear configured to provide rotational output to the second portion of the second axle shaft, wherein the ring gear is in meshing engagement with the first pinion gear, the first pinion gear is coupled for common rotation with the second pinion gear, and the second pinion gear is in meshing engagement with the sun gear.

In addition to the foregoing, the described tank steer gear set assembly may include one or more of the following features: wherein the compound planetary gear set further includes a first sun gear configured to connect to the first portion of the second axle shaft for rotational input, a first pinion gear rotatably supported by the carrier, a second pinion gear rotatably supported by the carrier, and a second sun gear configured to provide rotational output to the second portion of the second axle shaft, wherein the first sun gear is in meshing engagement with the first pinion gear, the first pinion gear is in meshing engagement with the second pinion gear, and the second pinion gear is in meshing engagement with the second sun gear.

In accordance with another example aspect of the invention, a vehicle drivetrain assembly is provided. In one example, the vehicle drivetrain assembly includes a differential, a first axle shaft operably coupled to the differential, a second axle shaft having first and second portions, the first portion operably coupled to the differential, and a tank steer gear set assembly having a compound planetary gear set operably coupled between the first portion and the second portion of the second axle shaft. The gear set assembly is selectively operable in a tank steer mode that rotates one or more wheels on a first side of the vehicle in a first direction, and rotates one or more wheels on an opposite second side of the vehicle in a second direction opposite the first direction to thereby rotate the vehicle. The gear set assembly operates in the tank steer mode by selectively grounding a carrier of the compound planetary gear set such that the second portion of the second axle shaft is rotated in a direction opposite the first axle shaft.

In addition to the foregoing, the described vehicle drivetrain assembly may include one or more of the following features: a link connected for common rotation with the carrier, a first clutch configured to selectively couple the link to the first portion of the second axle shaft for common rotation, and a second clutch configured to selectively ground the carrier; wherein the gear set assembly is selectively operable in a direct drive mode where the first axle shaft and the second portion of the second axle shaft rotate in the same direction, wherein the gear set assembly operates in the direct drive mode by engaging the first clutch and disengaging the second clutch; and wherein the gear set assembly operates in the tank steer mode by disengaging the first clutch and engaging the second clutch.

In addition to the foregoing, the described vehicle drivetrain assembly may include one or more of the following features: wherein the compound planetary gear set further includes a sun gear connected to the first portion of the second axle shaft for rotational input, a first pinion gear and a second pinion gear rotatably supported by the carrier on a common axis, and a ring gear configured to provide rotational output to the second portion of the second axle shaft, wherein the sun gear is in meshing engagement with the first pinion gear, the first pinion gear is coupled for common rotation with the second pinion gear, and the second pinion gear is in meshing engagement with the ring gear.

In addition to the foregoing, the described vehicle drivetrain assembly may include one or more of the following features: wherein the compound planetary gear set further includes a ring gear connected to the first portion of the second axle shaft for rotational input, a first pinion gear and a second pinion gear rotatably supported by the carrier on a common axis, and a sun gear configured to provide rotational output to the second portion of the second axle shaft, wherein the ring gear is in meshing engagement with the first pinion gear, the first pinion gear is coupled for common rotation with the second pinion gear, and the second pinion gear is in meshing engagement with the sun gear.

In addition to the foregoing, the described vehicle drivetrain assembly may include one or more of the following features: wherein the compound planetary gear set further includes a first sun gear connected to the first portion of the second axle shaft for rotational input, a first pinion gear rotatably supported by the carrier, a second pinion gear rotatably supported by the carrier, and a second sun gear configured to provide rotational output to the second portion of the second axle shaft, wherein the first sun gear is in meshing engagement with the first pinion gear, the first pinion gear is in meshing engagement with the second pinion gear, and the second pinion gear is in meshing engagement with the second sun gear.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

According to the principles of the present application, systems and methods are described for performing a vehicle tank steer operation. In the example embodiments, a tank steer system is configured to enable the vehicle to rotate the wheels on one axle in opposite directions at zero vehicle speed, thereby enabling the vehicle to make very tight turns. While some level of functionality may be achieved by having tank steer on a single axle, higher functionality may be achieved by having the tank steer system installed on two or more axles. Thus, the system is configured to turn the wheels on one side of the vehicle in one direction (e.g., forward), while the wheels on the other side of the vehicle turn in the opposite direction (e.g., rearward), thereby rotating the vehicle around a center point.

In the example embodiments, the tank steer system provides a coaxial transmission power flow for a tank turn with one input at the differential axis (EDM or ICE) with maximum power density, efficiency, and minimum cost while meeting NVH, reliability, durability, and shift quality. In this way, the direction of one axle shaft is reversed during the tank turn, while both axle shafts rotate in the same direction during normal driving. The tank steer capability is provided by a gear set assembly having three different configurations, as described herein in more detail.

Figure 1:
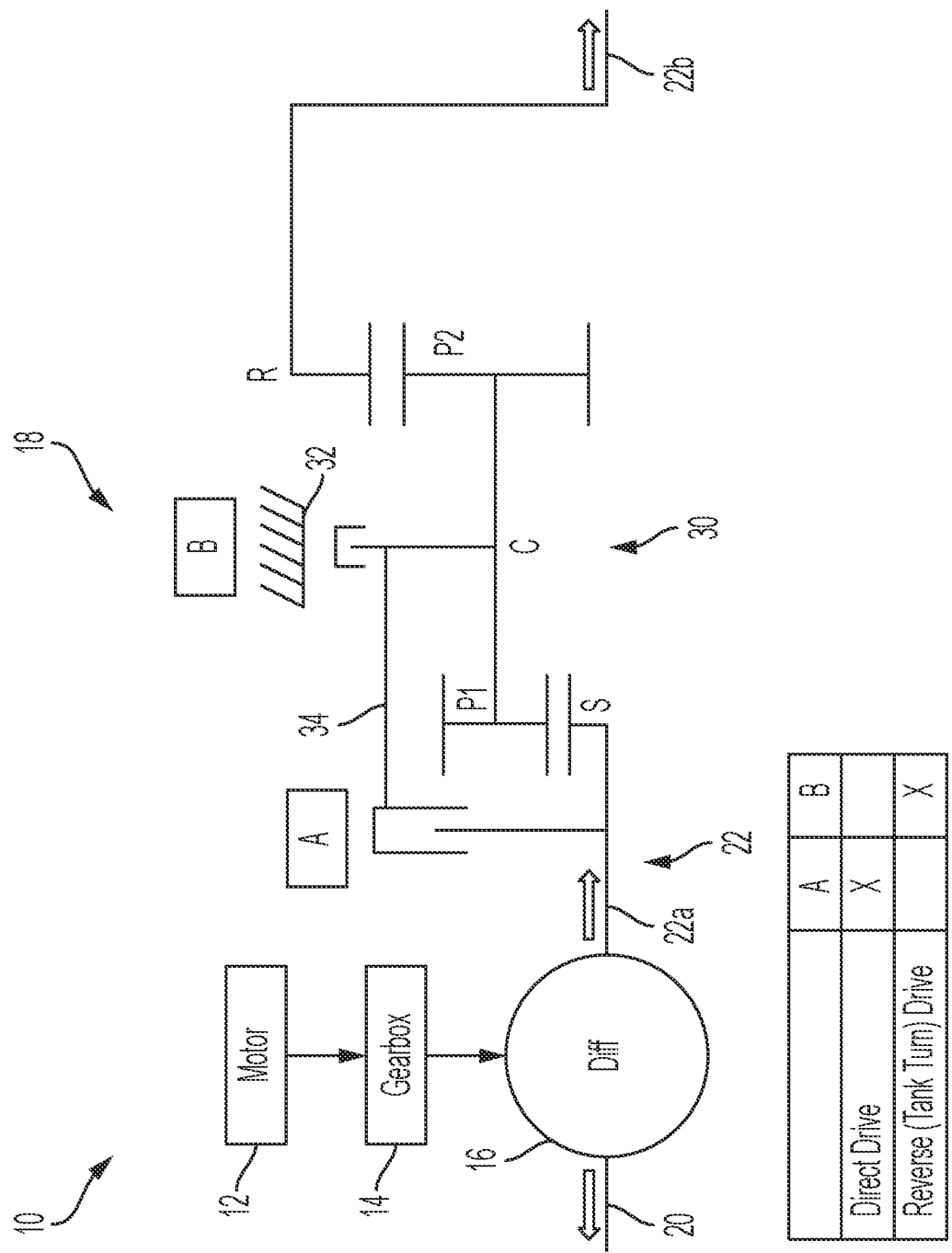
FIG. 1 is a schematic illustration of a vehicle powertrain having an example tank steer gear set assembly in accordance with the principles of the present application.
Figure 2:
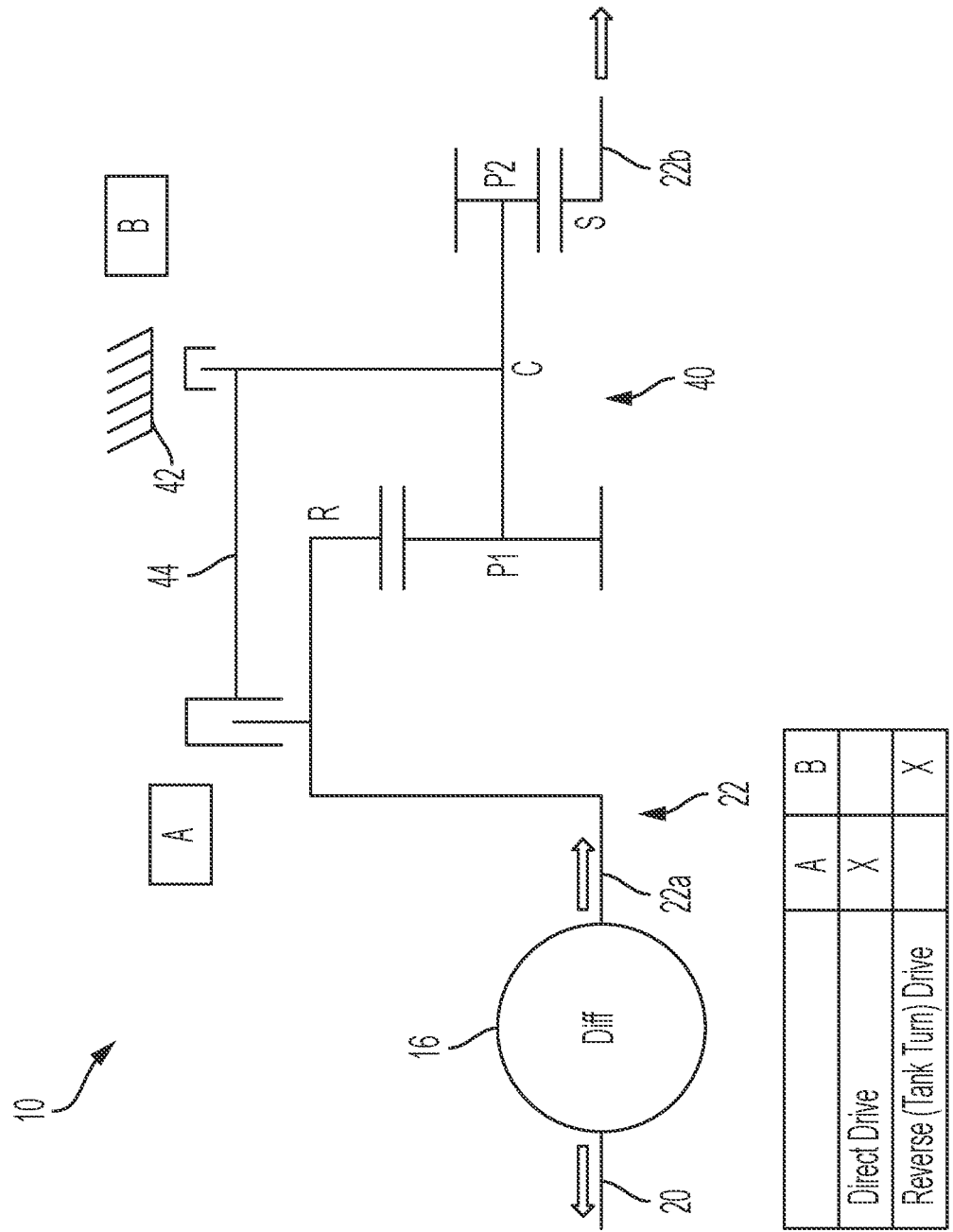
FIG. 2 is a schematic illustration of a vehicle drivetrain assembly having another example tank steer gear set assembly in accordance with the principles of the present application.
Figure 3:
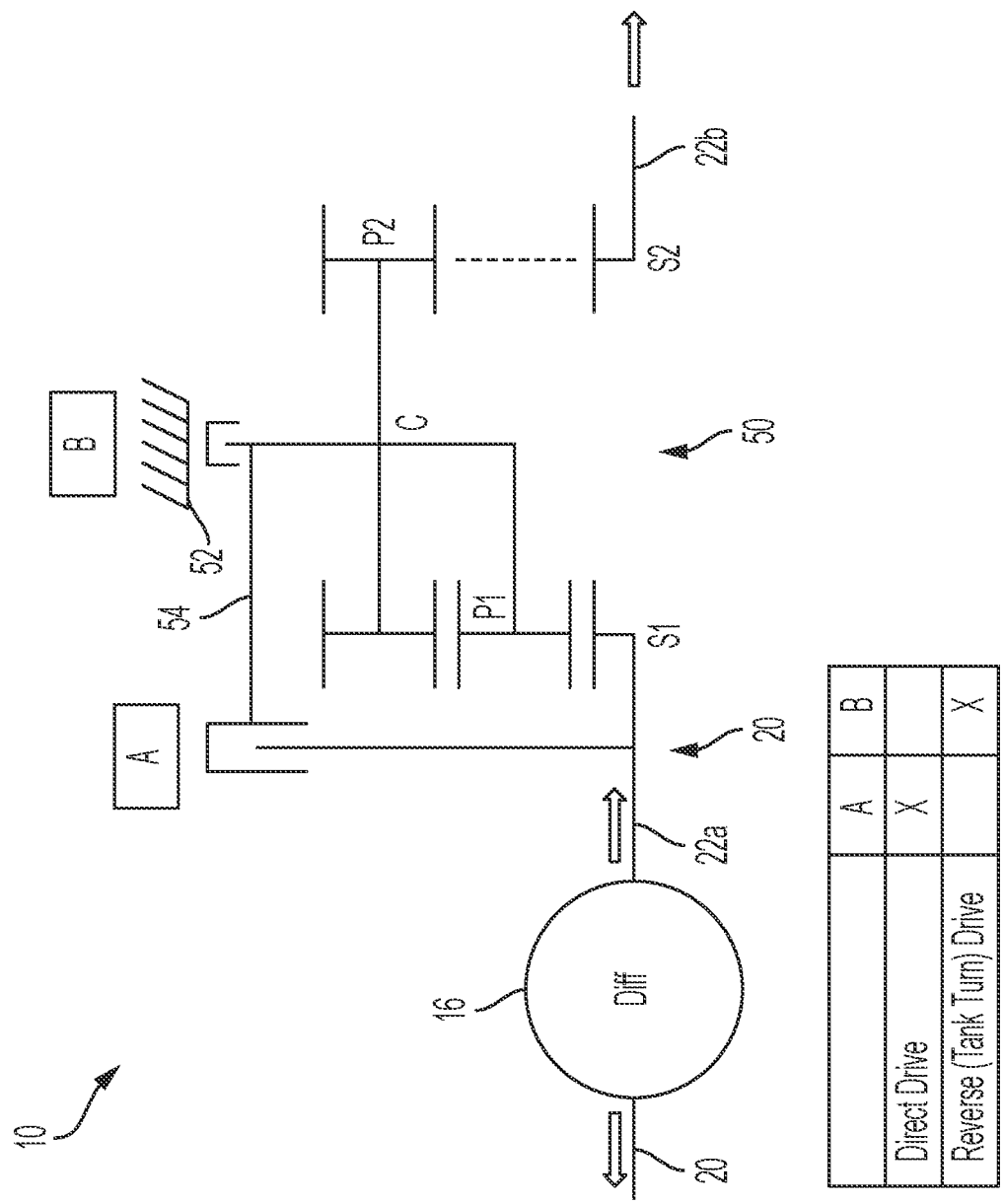
FIG. 3 is a schematic illustration of a vehicle drivetrain assembly having yet another example tank steer gear set assembly in accordance with the principles of the present application.

With general reference to FIGS. 1-3, a vehicle powertrain 10 in accordance with the principles of the present disclosure is illustrated. In the example embodiment, the powertrain 10 generally includes a propulsion system 12, a reduction gearbox assembly 14, a differential 16, and a tank steer gear set assembly 18. Each of FIGS. 1-3 illustrates a different configuration of the tank steer gear set assembly 18, as described herein in more detail.

In general, the propulsion system 12 may be an internal combustion engine or one or more motors (e.g., electric traction motor) configured to generate and transfer drive torque to a drivetrain assembly that includes the reduction gearbox assembly 14. Torque is then transferred from the gearbox assembly 14 to the differential 16 and first and second axle shafts 20, 22 (e.g., half shafts) in a conventional manner. In the example embodiment, the vehicle may include the illustrated configuration for each pair of axle shafts 20, 22 (front and rear), though in some examples, the configuration may only be utilized on a single pair of axle shafts 20, 22.

With reference now to FIG. 1, a first embodiment of the tank steer gear set assembly 18 will be described in more detail. In the example embodiment, the tank steer gear set assembly 18 is disposed on the second axle shaft 22, which includes an axle first portion 22a and an axle second portion 22b. The axle first portion 22a is rotatably coupled to the differential 16 to provide input torque to the gear set assembly 18, and the axle second portion 22b is configured to receive torque from the gear set assembly 18 to rotate a vehicle wheel (not shown).

In the example embodiment, the tank steer gear set assembly 18 includes a compound planetary gear set 30 and a housing 32. The compound planetary gear set 30 generally includes a sun gear 'S', a carrier 'C' rotatably supporting a set of first planetary pinion gears 'P1' and a set of second planetary pinion gears 'P2', and a ring gear 'R'. Each first planetary pinion gear 'P1' is coupled for common rotation with one second planetary pinion gear 'P2' such that they rotate at the same speed. The first pinion gears 'P1' are in meshing engagement with the sun gear 'S' and the second pinion gears 'P2' are in meshing engagement with the ring gear 'R'. In the example embodiment, each first pinion gear 'P1' is smaller and has less gear teeth than each second pinion gear 'P2'.

The gear set assembly 18 also includes a first Clutch A and a second Clutch B, each selectively engaged via a controller (not shown). In the illustrated example, Clutches A and B are dog clutches or wet clutches. However, it will be appreciated that first Clutch A and/or second Clutch B may be any suitable type of clutch that enables gear set assembly 18 to function as described herein.

In the example implementation, the sun gear 'S1' is connected for common rotation with the axle first portion 22a, and a connector or link 34 is connected for common rotation with carrier 'C'. The link 34 is selectively connected to the axle first portion 22a via Clutch A, and selectively grounded to the housing 32 via Clutch B. As previously noted, the carrier 'C' rotatably supports a plurality of pairs of one first pinion gear 'P1' and one second pinion gear 'P2' connected for rotation on a common axis (e.g., a common shaft). The sun gear 'S' is in meshing engagement with the first pinion gears 'P1', and the second pinion gears 'P2' are in meshing engagement with the ring gear 'R'. Pinion gears 'P2' provide output to ring gear 'R' which transfers rotational motion to the axle second portion 22b.

With continued reference to FIG. 1, operation of the first embodiment of the tank steer gear set assembly 18 will be described in more detail. As shown, the gear set assembly 18 is configured to selectively operate between (i) a normal direct drive mode and (ii) a tank steer mode. In the direct drive mode, the first and second axle shafts 20, 22 are rotated in the same direction. In the tank steer mode, the first axle shaft 20 is rotated in a first direction (e.g., clockwise) and the axle second portion 22b is rotated in an opposite second direction (e.g., counter-clockwise) to provide a tank steer operation.

In the direct drive mode, Clutch A is engaged and Clutch B is disengaged. Rotation from the axle first portion 22a is transferred to both the sun gear 'S1' and the link 34 such that the compound planetary gear set 30 rotates as a whole unit. In this way, the sun gear 'S' rotates at the same speed as the carrier 'C'. This causes the ring gear 'R' to rotate with the carrier 'C' to thereby transfer rotation to the axle second portion 22b in the same direction as the first axle shaft 20.

To shift operation to the tank steer mode, Clutch A is disengaged and Clutch B is engaged. Rotation from the axle first portion 22a is transferred to the sun gear 'S1', which rotates pinion gears 'P1' while the carrier 'C' is stationary due to the engagement of Clutch B. Rotation of the first pinion gears 'P1' causes rotation of the second pinion gears 'P2'. Rotation is then transferred from pinion gears 'P2' to ring gear 'R' to thereby rotate the axle second portion 22b in the direction opposite of the first axle shaft 20 to achieve the tank steer operation.

In the example embodiment, tank steer gear set assembly 18 advantageously provides selective reverse rotation of one axle shaft with minimum hardware where the input is a sun gear and the output is a ring gear. Moreover, the ring gear is advantageously not required to be splined to the housing 32, thereby not requiring a hard finished gear and reducing costs. In one example, to achieve the same rotational speed for both axle shafts 20, 22, the ratio of pinion gear teeth of 'P1' to 'P2' is 1:2 and the ratio of gear teeth of ring gear 'R' to sun gear 'S' is 2:1, when the overall total ratio is either 1 or −1.

With reference now to FIG. 2, a second embodiment of the tank steer gear set assembly 18 will be described in more detail. Similar to the first embodiment, the tank steer gear set assembly 18 is disposed on the second axle shaft 22, which includes axle first portion 22a and axle second portion 22b. The axle first portion 22a is rotatably coupled to the differential 16 to provide input torque to the gear set assembly 18, and the axle second portion 22b is configured to receive torque from the gear set assembly 18 to rotate a vehicle wheel (not shown).

In the example embodiment, the tank steer gear set assembly 18 includes a compound planetary gear set 40 and a housing 42. The compound planetary gear set 40 generally includes a sun gear 'S', a carrier 'C' rotatably supporting a set of first planetary pinion gears 'P1' and a set of second planetary pinion gears 'P2', and a ring gear 'R'. Each first planetary pinion gear 'P1' is coupled for common rotation with one second planetary pinion gear 'P2' such that they rotate at the same speed. The first pinion gears 'P1' are in meshing engagement with the ring gear 'R' and the second pinion gears 'P2' are in meshing engagement with the sun gear 'S'. In the example embodiment, each first pinion gear 'P1' is larger and has more gear teeth than each second pinion gear 'P2'.

The gear set assembly 18 also includes a first Clutch A and a second Clutch B. In the illustrated example, Clutches A and B are dog clutches or wet clutches. However, it will be appreciated that first Clutch A and/or second Clutch B may be any suitable type of clutch that enables gear set assembly 18 to function as described herein.

In the example implementation, the ring gear 'R' is connected for common rotation with the axle first portion 22a, and a connector or link 44 is connected for common rotation with carrier 'C'. The link 44 is selectively connected to the axle first portion 22a via Clutch A, and selectively grounded to the housing 42 via Clutch B. As previously noted, the carrier 'C' rotatably supports a plurality of pairs of one first pinion gear 'P1' and one second pinion gear 'P2' connected for rotation on a common axis (e.g., a common shaft). The ring gear 'R' is in meshing engagement with the first pinion gears 'P1', and the second pinion gears 'P2' are in meshing engagement with the sun gear 'S'. Pinion gears 'P2' provide output to sun gear 'S' which transfers rotational motion to the axle second portion 22b.

With continued reference to FIG. 2, operation of the second embodiment of the tank steer gear set assembly 18 will be described in more detail. As shown, the gear set assembly 18 is configured to selectively operate between (i) a normal direct drive mode and (ii) a tank steer mode. In the direct drive mode, the first and second axle shafts 20, 22 are rotated in the same direction. In the tank steer mode, the first axle shaft 20 is rotated in a first direction (e.g., clockwise) and the second axle shaft portion 22b is rotated in an opposite second direction (e.g., counter-clockwise) to provide a tank steer operation.

In the direct drive mode, Clutch A is engaged and Clutch B is disengaged. Rotation from the axle first portion 22a is transferred to both the ring gear 'R' and the link 44 such that the compound planetary gear set 40 rotates as a whole unit. In this way, the ring gear 'R' rotates at the same speed as the carrier 'C'. This causes the sun gear 'S' to rotate with the carrier 'C' to thereby transfer rotation to the axle second portion 22b in the same direction as the first axle shaft 20.

To shift operation to the tank steer mode, Clutch A is disengaged and Clutch B is engaged. Rotation from the axle first portion 22a is transferred to the ring gear 'R1', which rotates pinion gears 'P1' while the carrier 'C' is stationary due to the engagement of Clutch B. Rotation of the first pinion gears 'P1' causes rotation of the second pinion gears 'P2'. Rotation is then transferred from pinion gears 'P2' to sun gear 'S' to thereby rotate the axle second portion 22b in the direction opposite of the first axle shaft 20 to achieve the tank steer operation.

In the example embodiment, tank steer gear set assembly 18 advantageously provides selective reverse rotation of one axle shaft with minimum hardware where the input is a ring gear and the output is a sun gear. Moreover, the ring gear is advantageously not required to be splined to the housing 42, thereby not requiring a hard finished gear and reducing costs. In one example, to achieve the same rotational speed for both axle shafts 20, 22, the ratio of pinion gear teeth of 'P2' to 'P1' is 1:2 and the ratio of gear teeth of ring gear 'R' to sun gear 'S' is 2:1, when the overall total ratio is either 1 or −1.

Figure 4:
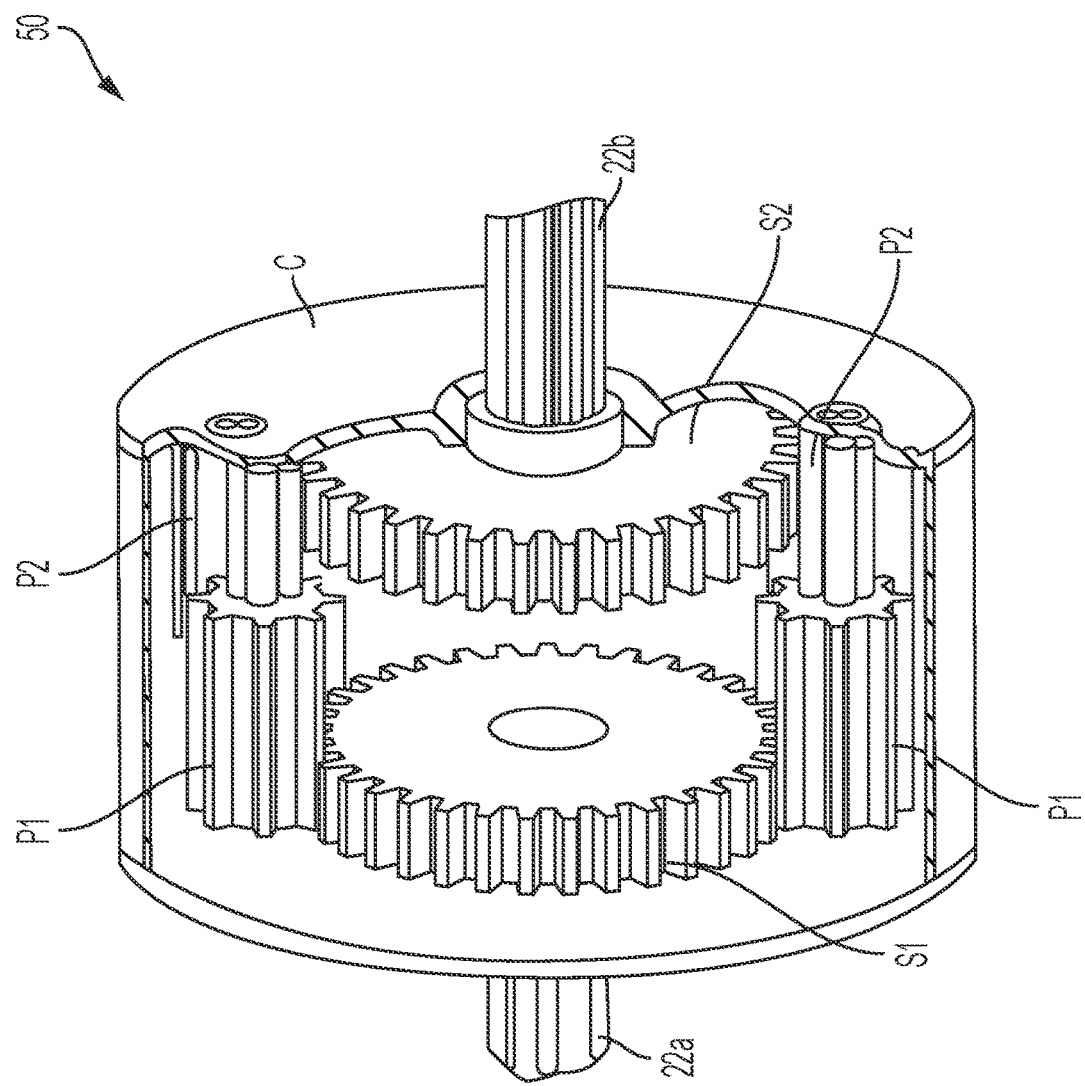
FIG. 4 is a perspective cutaway view of a conventional compound planetary gear set that may be utilized in the tank steer gear set assembly shown in FIG. 3, in accordance with the principles of the present application

With reference now to FIGS. 3 and 4, a third embodiment of the tank steer gear set assembly 18 will be described in more detail. In the example embodiment, the tank steer gear set assembly 18 is disposed on the second axle shaft 22, which includes an axle first portion 22a and an axle second portion 22b. The axle first portion 22a is rotatably coupled to the differential 16 to provide input torque to the gear set assembly 18, and the axle second portion 22b is configured to receive torque from the gear set assembly 18 to rotate a vehicle wheel (not shown).

In the example embodiment, the tank steer gear set assembly 18 includes a compound planetary gear set 50 and a housing 52. The compound planetary gear set 30 generally includes a first sun gear 'S1', a carrier 'C' rotatably supporting a set of first planetary pinion gears 'P1' and a set of second planetary pinion gears 'P2', and a second sun gear 'S2'. Each first planetary pinion gear 'P1' is in meshing engagement with one second planetary pinion gear 'P2'. The first pinion gears 'P1' are in meshing engagement with the first sun gear 'S1', and the second pinion gears 'P2' are in meshing engagement with the second sun gear 'S2'. In the example embodiment, each first pinion gear 'P1' has the same size and number of gear teeth as each second pinion gear 'P2'.

The gear set assembly 18 also includes a first Clutch A and a second Clutch B. In the illustrated example, Clutches A and B are dog clutches or wet clutches. However, it will be appreciated that first Clutch A and/or second Clutch B may be any suitable type of clutch that enables gear set assembly 18 to function as described herein.

In the example implementation, the sun gear 'S1' is connected for common rotation with the axle first portion 22a, and a connector or link 54 is connected for common rotation with carrier 'C'. The link 54 is selectively connected to the axle first portion 22a via Clutch A, and selectively grounded to the housing 52 via Clutch B. FIG. 4 illustrates an example conventional gear set, where the carrier 'C' rotatably supports a plurality of pairs of one first pinion gear 'P1' and one second pinion gear 'P2' on different planes and in meshing engagement. The first sun gear 'S1' is in meshing engagement with the first pinion gears 'P1' and the second pinion gears 'P2' are in meshing engagement with the second sun gear 'S2'. Pinion gears 'P2' provide output to sun gear 'S2' which transfers rotational motion to the axle second portion 22b.

With continued reference to FIG. 3, operation of the third embodiment of the tank steer gear set assembly 18 will be described in more detail. As shown, the gear set assembly 18 is configured to selectively operate between (i) a normal direct drive mode and (ii) a tank steer mode. In the direct drive mode, the first and second axle shafts 20, 22 are rotated in the same direction. In the tank steer mode, the first axle shaft 20 is rotated in a first direction (e.g., clockwise) and the axle second portion 22b is rotated in an opposite second direction (e.g., counter-clockwise) to provide a tank steer operation.

In the direct drive mode, Clutch A is engaged and Clutch B is disengaged. Rotation from the axle first portion 22a is transferred to both the sun gear 'S1' and the link 54 such that the compound planetary gear set 50 rotates as a whole unit. In this way, the sun gear 'S1' rotates at the same speed as the carrier 'C'. This causes the sun gear 'S2' to rotate with the carrier 'C' to thereby transfer rotation to the axle second portion 22b in the same direction as the first axle shaft 20.

To shift operation to the tank steer mode, Clutch A is disengaged and Clutch B is engaged. Rotation from the axle first portion 22a is transferred to the sun gear 'S1', which rotates pinion gears 'P1' while the carrier 'C' is stationary due to the engagement of Clutch B. Rotation of the first pinion gears 'P1' causes rotation of the second pinion gears 'P2'. Rotation is then transferred from pinion gears 'P2' to sun gear 'S2' to thereby rotate the axle second portion 22b in the direction opposite of the first axle shaft 20 to achieve the tank steer operation. In the example embodiment, tank steer gear set assembly 18 advantageously provides selective reverse rotation of one axle shaft with minimum hardware where the input is a sun gear and the output is a sun gear.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A tank steer gear set assembly for a vehicle having at least one set of first and second axle shafts, the gear set assembly configured to be operably coupled between a first portion and a second portion of the second axle shaft and comprising:
   a compound planetary gear set having a carrier;
   a first clutch; and
   a second clutch,
   wherein the gear set assembly is selectively operable in a tank steer mode that rotates one or more wheels on a first side of the vehicle in a first direction, and rotates one or more wheels on an opposite second side of the vehicle in a second direction opposite the first direction to thereby rotate the vehicle, and
   wherein the gear set assembly operates in the tank steer mode by selectively grounding the carrier via the second clutch such that the second portion of the second axle shaft is rotated in a direction opposite the first axle shaft.

2. The tank steer gear set assembly of claim 1, wherein the compound planetary gear set further includes a link connected for common rotation with the carrier.

3. The tank steer gear set assembly of claim 2, wherein the first clutch selectively couples the link to the first portion of the second axle shaft for common rotation.

4. The tank steer gear set assembly of claim 3, wherein the gear set assembly is selectively operable in a direct drive mode where the first axle shaft and the second portion of the second axle shaft rotate in the same direction,
   wherein the gear set assembly operates in the direct drive mode by engaging the first clutch and disengaging the second clutch.

5. The tank steer gear set assembly of claim 4, wherein the gear set assembly operates in the tank steer mode by disengaging the first clutch and engaging the second clutch.

6. The tank steer gear set assembly of claim 1, wherein the compound planetary gear set further comprises:
   a sun gear configured to connect to the first portion of the second axle shaft for rotational input;
   a first pinion gear and a second pinion gear rotatably supported by the carrier on a common axis; and
   a ring gear configured to provide rotational output to the second portion of the second axle shaft,
   wherein the sun gear is in meshing engagement with the first pinion gear, the first pinion gear is coupled for common rotation with the second pinion gear, and the second pinion gear is in meshing engagement with the ring gear.

7. The tank steer gear set assembly of claim 1, wherein the compound planetary gear set further comprises:
   a ring gear configured to connect to the first portion of the second axle shaft for rotational input;
   a first pinion gear and a second pinion gear rotatably supported by the carrier on a common axis; and
   a sun gear configured to provide rotational output to the second portion of the second axle shaft,
   wherein the ring gear is in meshing engagement with the first pinion gear, the first pinion gear is coupled for common rotation with the second pinion gear, and the second pinion gear is in meshing engagement with the sun gear.

8. The tank steer gear set assembly of claim 1, wherein the compound planetary gear set further comprises:
   a first sun gear configured to connect to the first portion of the second axle shaft for rotational input;
   a first pinion gear rotatably supported by the carrier;
   a second pinion gear rotatably supported by the carrier; and
   a second sun gear configured to provide rotational output to the second portion of the second axle shaft,
   wherein the first sun gear is in meshing engagement with the first pinion gear, the first pinion gear is in meshing engagement with the second pinion gear, and the second pinion gear is in meshing engagement with the second sun gear.

9. A vehicle drivetrain assembly comprising:
   a differential;
   a first axle shaft operably coupled to the differential;
   a second axle shaft having first and second portions, the first portion operably coupled to the differential; and
   a tank steer gear set assembly having a compound planetary gear set operably coupled between the first portion and the second portion of the second axle shaft,
   wherein the gear set assembly is selectively operable in a tank steer mode that rotates one or more wheels on a first side of the vehicle in a first direction, and rotates one or more wheels on an opposite second side of the vehicle in a second direction opposite the first direction to thereby rotate the vehicle,
   wherein the gear set assembly operates in the tank steer mode by selectively grounding a carrier of the compound planetary gear set such that the second portion of the second axle shaft is rotated in a direction opposite the first axle shaft.

10. The vehicle drivetrain assembly of claim 9, wherein the gear set assembly further comprises:
    a link connected for common rotation with the carrier;
    a first clutch configured to selectively couple the link to the first portion of the second axle shaft for common rotation; and
    a second clutch configured to selectively ground the carrier.

11. The vehicle drivetrain assembly of claim 10, wherein the gear set assembly is selectively operable in a direct drive mode where the first axle shaft and the second portion of the second axle shaft rotate in the same direction,
    wherein the gear set assembly operates in the direct drive mode by engaging the first clutch and disengaging the second clutch.

12. The vehicle drivetrain assembly of claim 11, wherein the gear set assembly operates in the tank steer mode by disengaging the first clutch and engaging the second clutch.

13. The vehicle drivetrain assembly of claim 9, wherein the compound planetary gear set further comprises:
    a sun gear connected to the first portion of the second axle shaft for rotational input;
    a first pinion gear and a second pinion gear rotatably supported by the carrier on a common axis; and
    a ring gear configured to provide rotational output to the second portion of the second axle shaft,
    wherein the sun gear is in meshing engagement with the first pinion gear, the first pinion gear is coupled for common rotation with the second pinion gear, and the second pinion gear is in meshing engagement with the ring gear.

14. The vehicle drivetrain assembly of claim 9, wherein the compound planetary gear set further comprises:
    a ring gear connected to the first portion of the second axle shaft for rotational input;
    a first pinion gear and a second pinion gear rotatably supported by the carrier on a common axis; and
    a sun gear configured to provide rotational output to the second portion of the second axle shaft,
    wherein the ring gear is in meshing engagement with the first pinion gear, the first pinion gear is coupled for common rotation with the second pinion gear, and the second pinion gear is in meshing engagement with the sun gear.

15. The vehicle drivetrain assembly of claim 9, wherein the compound planetary gear set further comprises:
    a first sun gear connected to the first portion of the second axle shaft for rotational input;
    a first pinion gear rotatably supported by the carrier;
    a second pinion gear rotatably supported by the carrier; and
    a second sun gear configured to provide rotational output to the second portion of the second axle shaft,
    wherein the first sun gear is in meshing engagement with the first pinion gear, the first pinion gear is in meshing engagement with the second pinion gear, and the second pinion gear is in meshing engagement with the second sun gear.

\* \* \* \* \*